United States Patent
Hong et al.

(10) Patent No.: US 9,535,942 B2
(45) Date of Patent: Jan. 3, 2017

(54) APPARATUS AND METHOD FOR MANAGING APK FILE IN AN ANDROID PLATFORM

(71) Applicant: SEWORKS, Inc., Seoul (KR)

(72) Inventors: Dong Cheol Hong, Seoul (KR); Chung Hui Kim, Seoul (KR); Dong Seon Kim, Busan (KR); Ji Suk Gwon, Chungcheongnam-do (KR); Min Pyo Hong, Seoul (KR)

(73) Assignee: SEWORKS, Inc., Seoul (KR)

( * ) Notice: Subject to any disclaimer, the term of this patent is extended or adjusted under 35 U.S.C. 154(b) by 0 days.

(21) Appl. No.: 14/821,657

(22) Filed: Aug. 7, 2015

(65) Prior Publication Data

US 2016/0132547 A1    May 12, 2016

(30) Foreign Application Priority Data

Nov. 11, 2014  (KR) .................. 10-2014-0156065

(51) Int. Cl.
*G06F 17/30*    (2006.01)
*G06F 21/62*    (2013.01)

(52) U.S. Cl.
CPC ..... *G06F 17/30371* (2013.01); *G06F 21/6209* (2013.01)

(58) Field of Classification Search
CPC .............. G06F 17/30864; G06F 17/30867; G06F 17/30371

(Continued)

(56) References Cited

U.S. PATENT DOCUMENTS 8,868,924 B1 * 10/2014 Filatov ............... G06F 8/60
                                                   713/176

8,892,876 B1 * 11/2014 Huang ............... G06F 21/6209
                                                   713/165

(Continued)

FOREIGN PATENT DOCUMENTS

CN      103413076 A  * 11/2013
CN      10-3886230    6/2014

(Continued)

OTHER PUBLICATIONS

Notification of reasons of refusal dated Dec. 11, 2014 from corresponding Korean application No. 10-2014-0156065 with English translation.

(Continued)

*Primary Examiner* — Thanh-Ha Dang
(74) *Attorney, Agent, or Firm* — Intellectual Property Law Group LLP

(57) ABSTRACT

The present invention relates to an apparatus for managing an APK file in the Android platform in order to forestall an executable file in an APK file from being analyzed by reverse engineering or decompiling that comprises a file reader that reads an original .dex file in the APK file, a file modifier that modifies the original .dex file the file reader has read and stores the modified .dex file in a readable folder in the APK file, a file creator that accesses the folder to read and restore the original .dex file, creates a temporary .dex file that is can be loaded onto memory and adds the temporary .dex file to the APK file in order to create a protected APK file and a file executer that reads from the folder and restores, if the Android platform requests the protected APK file to be executed, the modified original .dex file by executing the temporary .dex file and loads the restored original .dex file onto memory in order to execute the protected APK file.

1 Claim, 5 Drawing Sheets

(58) Field of Classification Search
USPC .......................................................... 707/690
See application file for complete search history.

(56) References Cited

U.S. PATENT DOCUMENTS

| | | | | |
|---|---|---|---|---|
| 8,984,299 | B1* | 3/2015 | Yi | G06F 21/125 |
| | | | | 713/189 |
| 9,208,348 | B1* | 12/2015 | Brennan | G06F 21/6209 |
| 9,213,850 | B2* | 12/2015 | Barton | G06F 21/604 |
| 2013/0061222 | A1* | 3/2013 | Hwang | G06F 9/45516 |
| | | | | 718/1 |
| 2013/0232540 | A1* | 9/2013 | Saidi | G06F 21/6218 |
| | | | | 726/1 |
| 2014/0351947 | A1* | 11/2014 | Shim | G06F 21/57 |
| | | | | 726/26 |
| 2015/0026483 | A1* | 1/2015 | Jiang | G06F 21/10 |
| | | | | 713/190 |
| 2015/0026827 | A1* | 1/2015 | Kao | G06F 21/6218 |
| | | | | 726/29 |
| 2015/0154407 | A1* | 6/2015 | Yi | G06F 21/14 |
| | | | | 713/194 |
| 2015/0370553 | A1* | 12/2015 | Ben-Haim | G06F 8/68 |
| | | | | 717/169 |
| 2016/0124757 | A1* | 5/2016 | Nadarthur Sreenivasan | G06F 8/65 |
| | | | | 717/172 |

FOREIGN PATENT DOCUMENTS

| | | |
|---|---|---|
| KR | 10-1161778 | 1/2012 |
| KR | 10-1214893 | 1/2013 |
| KR | 10-2014-0029562 | 3/2014 |
| KR | 10-2014-0114769 | 9/2014 |

OTHER PUBLICATIONS

Amendment submitted Feb. 2, 2015 for corresponding Korean application No. 10-2014-0156065 with English translation.

* cited by examiner

APPARATUS AND METHOD FOR MANAGING APK FILE IN AN ANDROID PLATFORM

CROSS-REFERENCE TO RELATED APPLICATION

This application claims foreign priority under 35 U.S.C. §119 to Korean Patent Application no. 10-2014-0156065, filed in the Republic of Korea on Nov. 11, 2014, the entire contents of which are hereby incorporated by reference.

BACKGROUND

Field of the Invention

The present invention relates to managing an APK file on the Android platform and, more specifically, to an apparatus and a method for managing an APK file in the Android platform in order to forestall an executable file in an APK file from being analyzed by reverse engineering or decompiling.

Background Art

As supply of diverse mobile devices such as smartphone has been skyrocketing, damage is reported in rapid succession caused by malicious applications that intend to an illegal access to a variety of personal information stored in those devices. It is relatively easy to decompile the executable file of an application, which accounts for one of reasons of such malicious applications. A technique to forestall the application decompiling is, inter alia, code obfuscation.

Decompiling is a technique to extract the original source code, which existed prior to compiling, from the machine language or assembler that has already compiled. Since, in many cases, machine language does not correspond to the source code of its high-level language, it is very difficult to decompile. There is DeDe (Delphi decompiler) to decompile Delphi while there are various decompilers including Jasmine, Jad, Mocha, etc., for Java.

Especially, Java creates, when compiled, an executable file that has class as its extension and JVM (Java virtual machine) interprets the executable file while, in Android, Dalvik VM (Dalvik virtual machine) decompresses an APK (Android application package) file and a .dex is used as an executable file.

An APK file that is, in general, on the basis of the ZIP file format and has a structure described in Table 1.

TABLE 1

| Filename | Description |
| --- | --- |
| AndroidManifest.xml | Defines the entire structure of APK executable files and specifies classes that set additional permissions or that use additional functions. |
| Classes.dex. | Stores executable code of the Android platform. |
| META-INF | Folder containing authorized key values. |
| Res | Images and layouts related to graphics. |
| Lib | SO(Shared object) library that does not use Dalvik. |

When compiled, Java source code is converted a bytecode that Dalvik VM can interpret and saved as classes.dex.

Figures 1, 2:
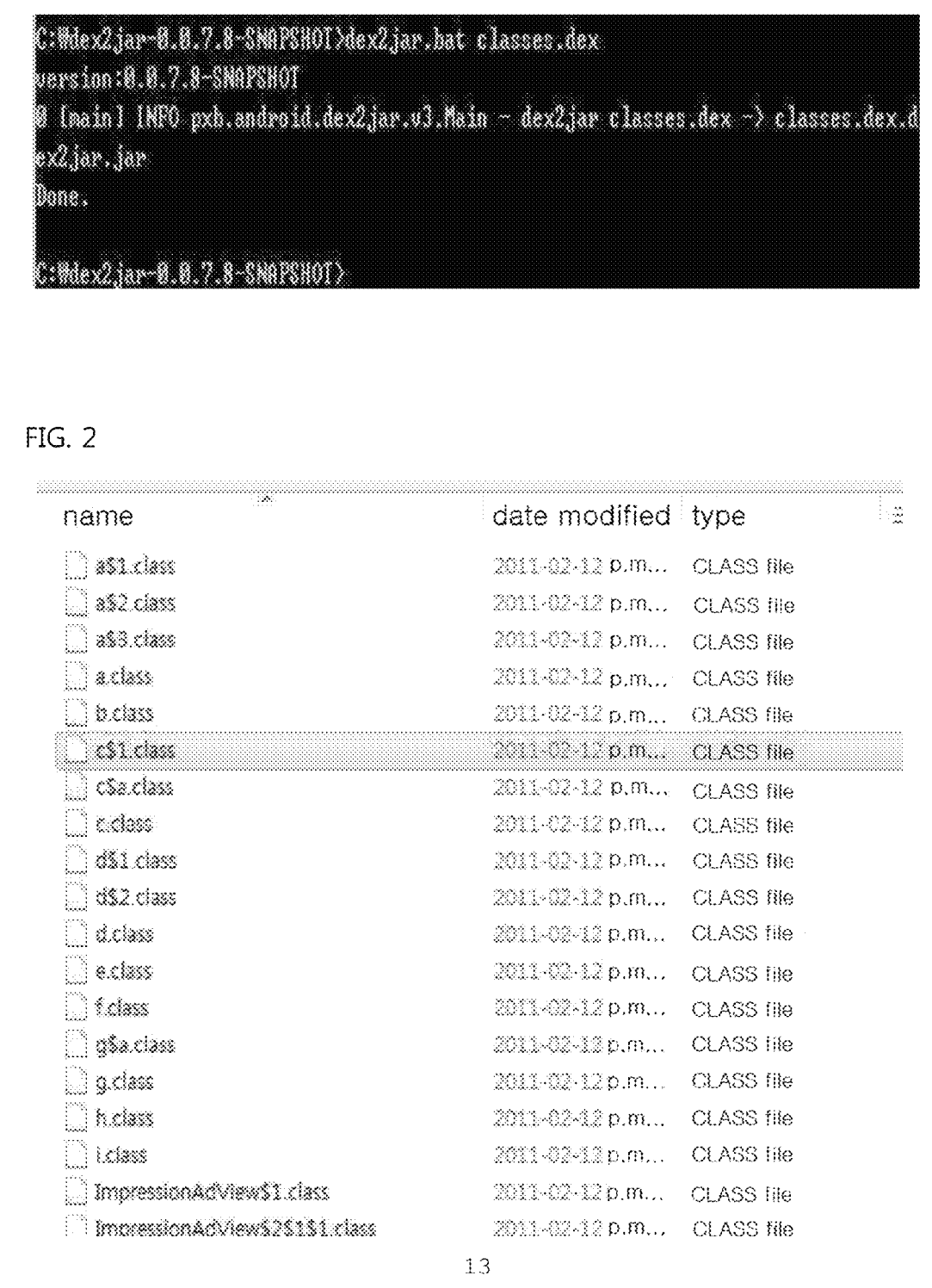

FIGS. 1 through 3 illustrate a procedure example that a classes.dex is decompiled to a .java file by an existing decompiling technique, wherein the .dex file is converted to a .class file then decompiled to a .java file. In other words, a .dex file is decompiled, as illustrated in FIG. 1, to a .class file that is described in FIG. 2. Related source code that has been extracted from the executable file can be identified as in FIG. 3 by decompiling the .class file by mans of JD, a general decompiler for Java thereafter. Accordingly, Android is vulnerable to decompiling in that it uses Dalvik that is a language similar to Java.

Various decompiling tools, for example dex2jar, have recently been developed maladapting the vulnerability, which requires code obfuscation techniques to forestall such decompiling activities. Conventional code obfuscation techniques include DEX analysis prohibition techniques that add code that simply disrupts .dex file analyses or anti-decompiling techniques. A code addition method has, however, demerits in that it may allow reverse engineering or decompiling upon removing the code out of the corresponding .dex file.

PRIOR ART DOCUMENT

Patent Document

Patent Document 1: Korean Notice of Publication of Registered Patent No. 10-1161778 (Jul. 3, 2012)

SUMMARY

Technical Problem

The present invention provides an apparatus and a method for managing an APK file in the Android platform that modifies the original .dex file of an APK file in the Android platform, stores the modified .dex file in a predetermined folder, creates a temporary .dex file and adds the temporary .dex file to the APK file in order to modify the APK file so that the source code of the APK file, upon being disclosed, cannot be restored and analyzed. The present invention also provides an apparatus and a method for managing an APK file on the Android platform that executes the original APK file, the original .dex file has been replaced, by restoring the modified original .dex file in a predetermined folder and loading it onto memory.

Technical Solution

To achieve the objectives, the present invention provides an apparatus for managing an APK file in the Android platform including a file reader that reads an original .dex file in the APK file; a file modifier that modifies the original .dex file the file reader has read and stores the modified .dex file in a readable folder in the APK file; a file creator that accesses the folder to read and restore the original .dex file, creates a temporary .dex file that is can be loaded onto memory and adds the temporary .dex file to the APK file in order to create a protected APK file; and a file executer that reads from the folder and restores, if the Android platform requests the protected APK file to be executed, the modified original .dex file by executing the temporary .dex file and loads the restored original .dex file onto memory in order to execute the protected APK file.

The file modifier included in the apparatus for managing an APK file the present invention provides reads the original .dex file and compresses or encrypts the original .dex file then stores the compressed or encrypted original .dex file in the folder. The temporary .dex file created by the apparatus for managing an APK file the present invention provides includes code that accesses, by means of a function the Android platform provides, the folder, reads and restores the modified original .dex file and loads the restored .dex file onto memory.

To achieve the objectives, the present invention also provides a method for managing an APK file in the Android platform including a stage in which a file reader reads an original .dex file in the APK file; a stage in which a file modifier modifies the original .dex file the file reader has read and stores the modified .dex file in a readable folder in the APK file; a stage in which a file creator accesses the folder to read and restore the original .dex file, creates a temporary .dex file that is can be loaded onto memory and adds the temporary .dex file to the APK file in order to create a protected APK file; a stage in which a file executer reads from the folder and restores, if the Android platform requests the protected APK file to be executed, the modified original .dex file by executing the temporary .dex file; and a stage that loads the restored original .dex file onto memory and executes the protected APK file.

The stage that stores the modified .dex file in a readable folder in the APK file included in the method for managing an APK file the present invention provides reads the original .dex file and compresses or encrypts the original .dex file then stores the compressed or encrypted original .dex file in the folder. The stage that creates the protected APK file creates the temporary .dex file creating code that accesses, by means of a function the Android platform provides, the folder, reads and restores the modified original .dex file and loads the restored .dex file onto memory.

Advantageous Effects of Invention

An apparatus and a method for managing an APK file according to the present invention modifies the original .dex file of an APK file in the Android platform, stores the modified .dex file in a predetermined folder, creates a temporary .dex file and adds the temporary .dex file to the APK file in order to modify the APK file so that the source code of the APK file, upon being disclosed, cannot be restored and analyzed.

BRIEF DESCRIPTION OF THE DRAWINGS

FIGS. 1 through 3 illustrate a procedure example that a classes.dex is decompiled to a .java file by an existing decompiling technique.

DETAILED DESCRIPTION OF SPECIFIC EMBODIMENTS

Best Mode

Embodiments according to the present invention will now be described in detail with reference to accompanying drawings.

Figure 3:
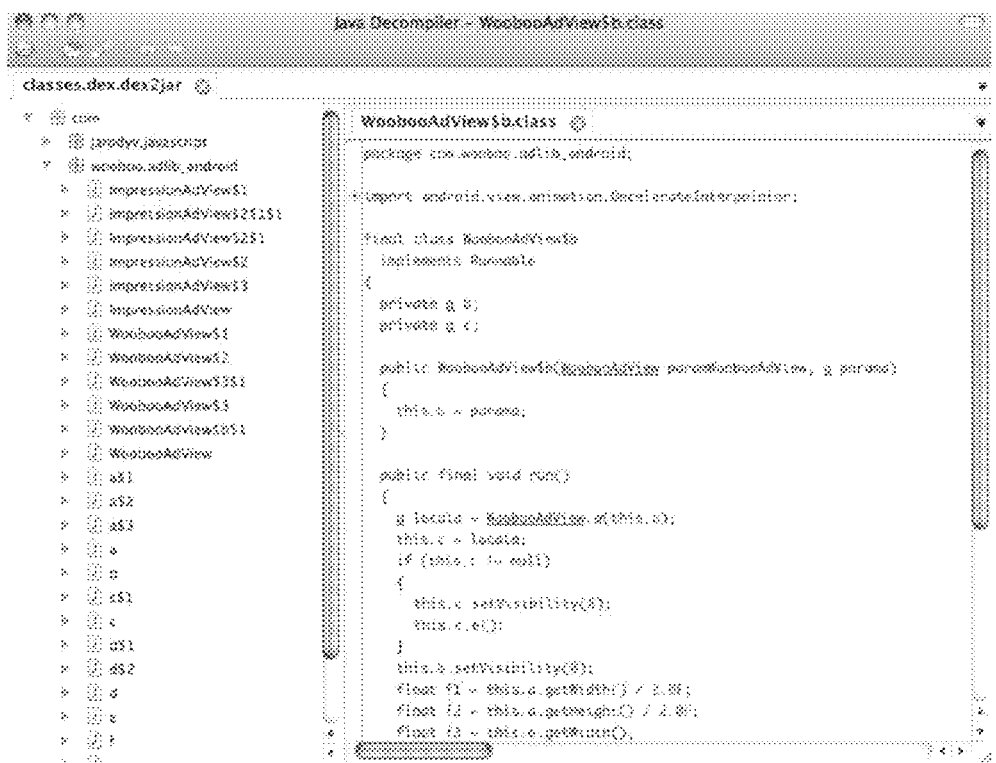
Figure 4:
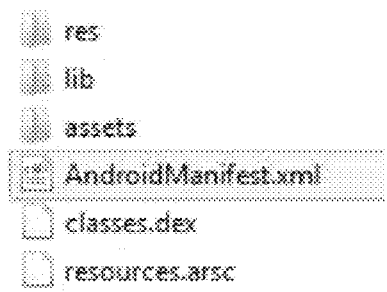
FIG. 4 illustrates a folder structure of an APK file in the Android platform according to an embodiment of the present invention.

FIG. 4 illustrates a folder structure of an APK file in the Android platform according to an embodiment of the present invention. An APK file may contain, as illustrated in FIG. 4, a resource file folder, res, a library folder, lib, a readable folder, asset, an xml file that contains information on applications and execution permissions, etc., an executable file that corresponds to a binary file that operates in Dalvik VM, etc.

Figure 5:
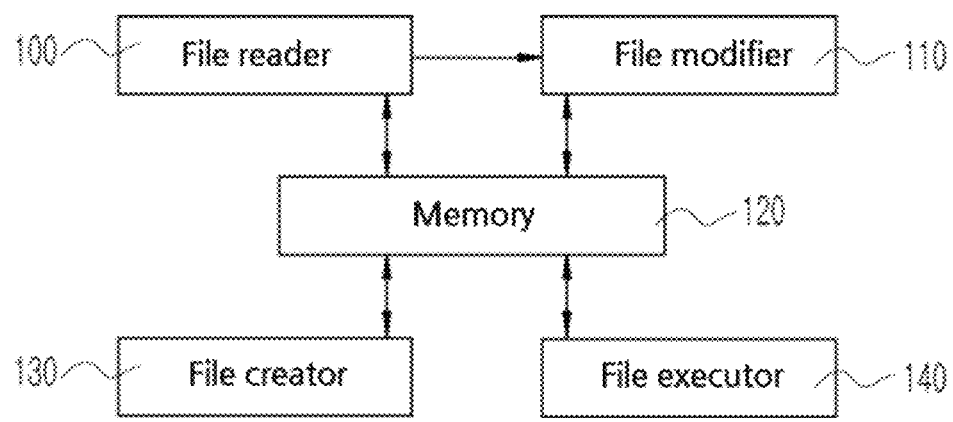
FIG. 5 is a block diagram that describes an apparatus for managing an APK file in the Android platform according to an embodiment of the present invention.

An apparatus for managing an APK file in the Android platform, which is to protect an APK file and execute the protected APK file to prevent the APK file that has such a structure from being decompiled or reverse-engineered, will now be described with reference to FIG. 5. FIG. 5 is a block diagram that describes an apparatus for managing an APK file in the Android platform according to an embodiment of the present invention. The apparatus for managing an APK file may include, as illustrated in FIG. 5, a file reader 100, a file modifier 110, memory 120, a file creator 130 and a file executer 140.

The file reader 100 reads an original .dex file (classes.dex), which is equivalent to an executable file, from an APK file stored in the memory 120 of a device such as smartphone the Android platform operates and provides the file modifier 110 with the .dex file. The file modifier 110 modifies the original .dex file then stores the modified original .dex file in the predetermined, readable folder, asset, in the APK file, where "to modify" may mean to encrypt, to compress, etc. of the original .dex file. The memory 120 stores various forms of files required for the Android platform to operate such as APK files, C/C++ libraries, etc.

Upon executing the APK file, the original .dex file may be loaded onto the memory 120. Upon the original .dex file being modified and saved in the asset folder, the file creator 130 creates a protected APK file by creating a temporary .dex file (New classes.dex) that corresponds to the original .dex file and adding the temporary .dex file to the APK file, where the temporary .dex file may include code that accesses the folder the modified original .dex file is stored in, reads and restores the modified original .dex file from the folder and loads the modified original .dex file onto the memory 120. Meanwhile, the code may use any one of various library functions the Android platform provides.

The file executer 140 may, upon request to execute the protected APK file, execute the temporary .dex included in the protected APK file, read and restore the modified original .dex file in the folder and load the restored .dex file onto the memory 120, according to which the protected APK file is executed by means of the original .dex file loaded onto the memory 120.

Figure 6:
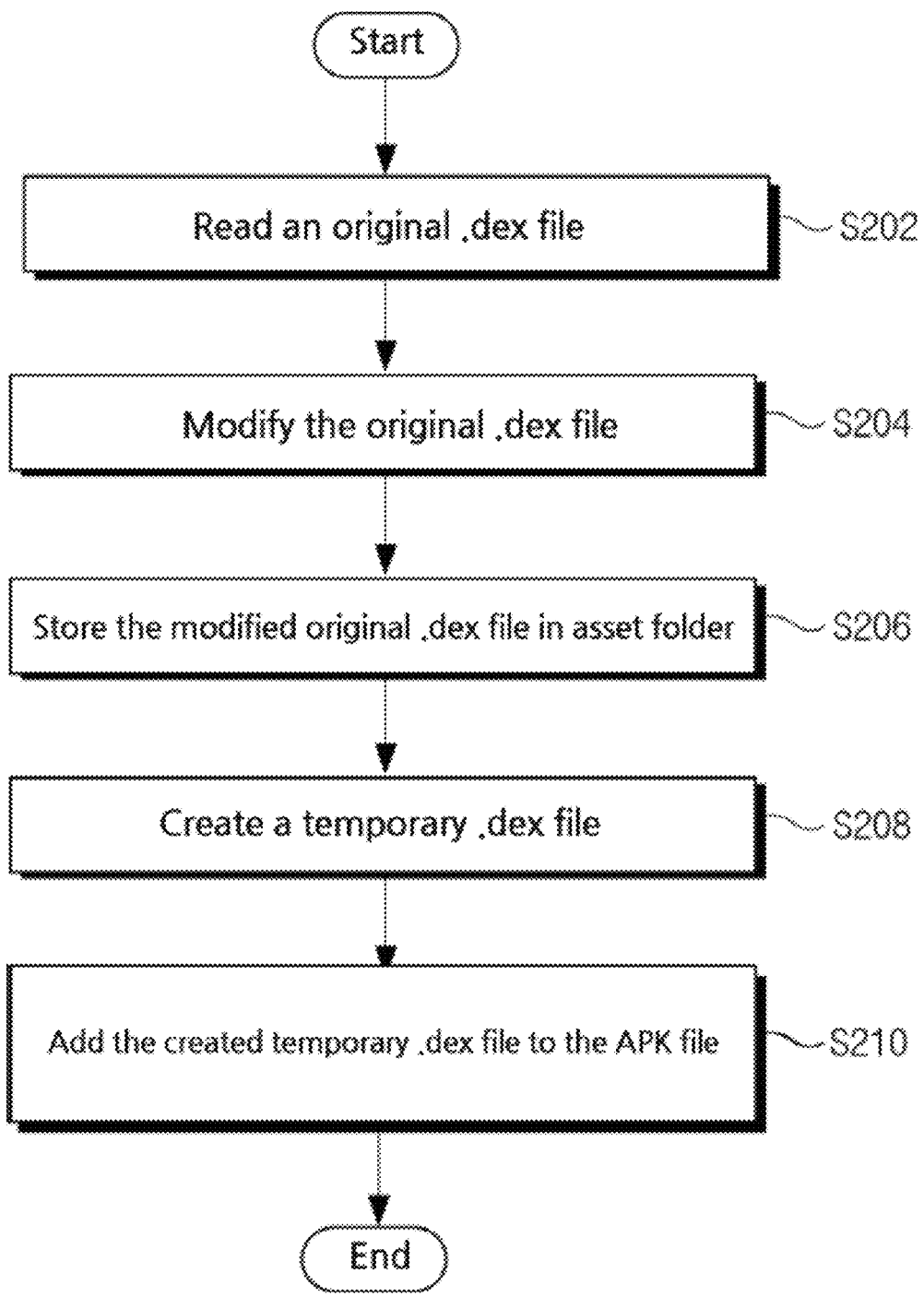
FIG. 6 is a flowchart that describes a procedure via which an apparatus for managing an APK file protects the APK file according to an embodiment of the present invention.

Procedure via which the apparatus for managing an APK file with such a structure in the Android platform will now be described with reference to FIGS. 6 and 7. FIG. 6 is a flowchart that describes a procedure via which an apparatus for managing an APK file protects the APK file according to an embodiment of the present invention.

As illustrated in FIG. 6, the file reader 100 reads the original .dex file included in the APK file from the memory 120 then provides the file modifier 110 with the original .dex file thus read (S202). The file modifier 110 modifies the original original .dex file the file reader 110 provides by compressing or encrypting the original .dex file (S204) then stores the modified original .dex file in the asset folder, which is readable, in the APK file (S206).

The file creator 130, thereafter, creates a temporary .dex file that corresponds to the original .dex file read from the APK file. More specifically, the file creator 130 creates a temporary .dex file to which code is added which accesses the readable asset folder, reads the modified original .dex file, restores the modified, and thus restored, original .dex file and loads the restored .dex file onto the memory 120 (S208), and adds the temporary .dex file to the APK file (S210). Each of the plurality APK files is converted to the corresponding protected APK file by repeatedly executing the stages S202 through S210.

Figure 7:
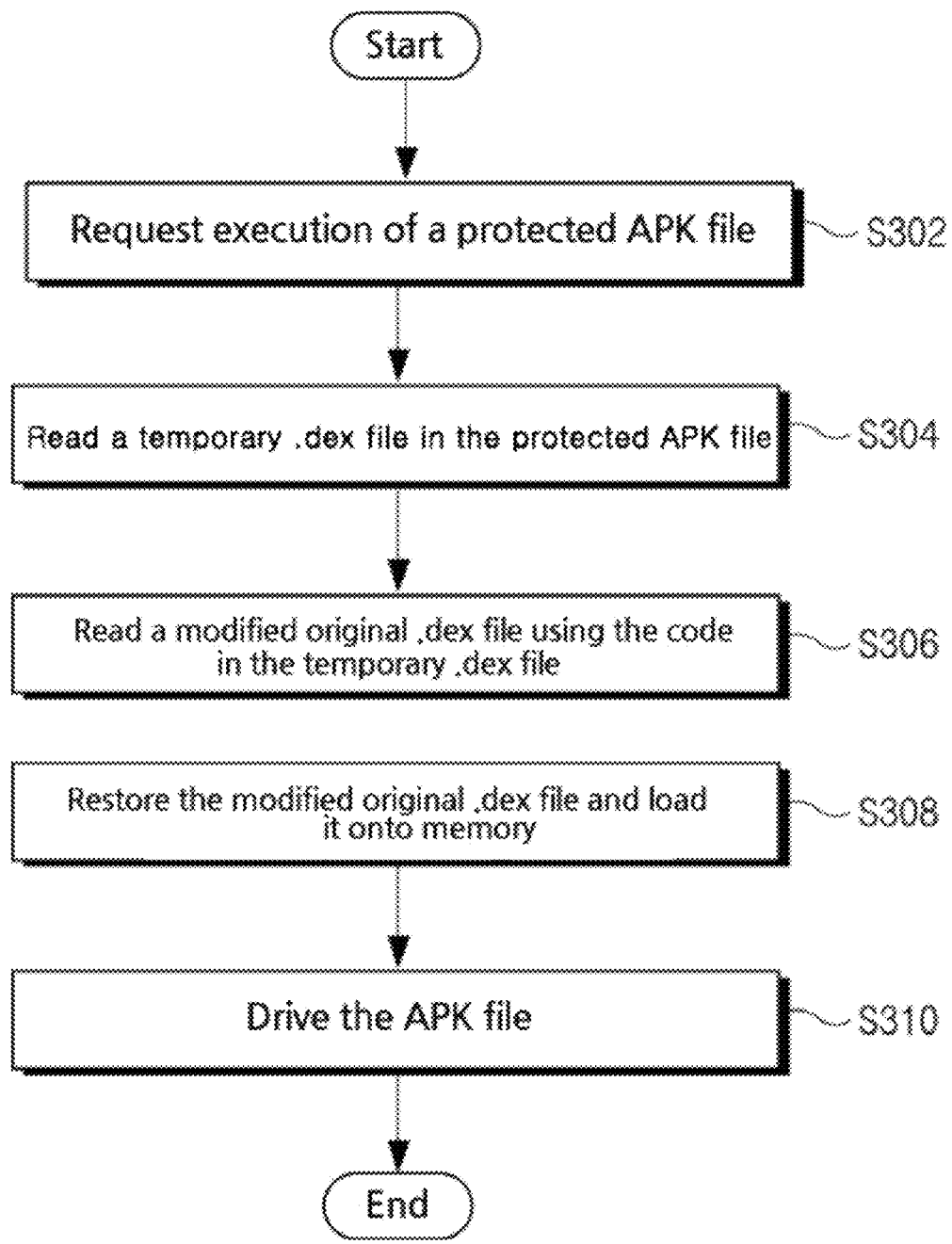
FIG. 7 is a flowchart that describes a procedure via which a plurality of APK files, which have been protected via the procedure illustrated in FIG. 6, are executed.

FIG. 7 is a flowchart that describes a procedure via which a plurality of APK files, which have been protected via the procedure illustrated in FIG. 6, are executed. As illustrated in FIG. 7, upon receiving a request for executing a protected APK file (S302), the file executor 140 reads a temporary .dex file from a protected APK file (S304), accesses the asset folder by means of the code added to the temporary .dex file and reads the modified original .dex file (S306). The file modifier 140 restores, thereafter, the modified original .dex file by means of the code and loads the restored .dex file onto the memory 120 (S308). According to the previous stages, the file executor 140 drives the protected APK file by means of the original .dex file loaded on the memory 120 (S310).

REFERENCE NUMERALS

100: File reader
110: File modifier
120: Memory
130: File creator
140: File executor

What is claimed is:

1. A method for managing an Android application package (hereinafter referred to as "APK") file in the Android platform including:

a stage in which a file reader reads an original .dex file in the APK file;

a stage in which a file modifier modifies the original .dex file which the file reader has read and stores the modified .dex file in a readable folder in the APK file;

a stage in which a file creator accesses the folder to read and restore the original .dex file, creates a temporary .dex file that is loaded onto memory and adds the temporary .dex file to the APK file in order to create a protected APK file;

a stage in which a file executer reads from the folder and restores, if the Android platform requests the protected APK file to be executed, the modified original .dex file by executing the temporary .dex file; and a stage that loads the restored original .dex file onto memory and executes the protected APK file, wherein the stage that stores the modified .dex file in a readable folder in the APK file reads the original .dex file and compresses or encrypts the original .dex file then stores the compressed or encrypted original .dex file in the folder, and wherein the stage that creates the protected APK file creates the temporary .dex file creating code that accesses, by a function the Android platform provides, the folder, wherein the stage that creates the protected APK file reads and restores the modified original .dex file and loads the restored .dex file onto memory.

* * * * *